United States Patent [19]

Rumreich et al.

[11] Patent Number: 5,502,501
[45] Date of Patent: Mar. 26, 1996

[54] FIELD TYPE DETECTOR FOR VIDEO SIGNAL

[75] Inventors: Mark F. Rumreich; Barth A. Canfield, both of Indianapolis, Ind.

[73] Assignee: Thomson Consumer Electronics, Inc., Indianapolis, Ind.

[21] Appl. No.: 220,566

[22] Filed: Mar. 31, 1994

[51] Int. Cl.[6] ................................................. H04N 5/08
[52] U.S. Cl. ................................... 348/526; 348/497
[58] Field of Search ...................... 348/497, 607, 348/526, 527; 358/158; H04N 7/00, 11/00, 5/21, 5/213, 5/217, 5/08

[56] References Cited

U.S. PATENT DOCUMENTS

| | | |
|---|---|---|
| 3,485,950 | 12/1969 | Reiser . |
| 4,608,602 | 8/1986 | Grantham-Hill . |
| 4,792,853 | 12/1988 | Yamagishi et al. . |
| 4,858,008 | 8/1989 | Sieben et al. . |
| 5,025,496 | 6/1991 | Canfield . |

*Primary Examiner*—James J. Groody
*Assistant Examiner*—Nina N. West
*Attorney, Agent, or Firm*—J. S. Tripoli; P. M. Emanuel; R. G. Coalter

[57] ABSTRACT

Jitter of an overlay display with respect to the primary display of a television receiver is avoided by assuring that the vertical and horizontal blanking signal components are sufficiently time spaced by preventing the number of clock pulses occurring between the horizontal and vertical components of the blanking signal from going below a selected number. The number of clock pulses between the negative going transition of the vertical blanking signal and the positive going transition of the first horizontal blanking signal is tracked and when the number of pulses fails to exceed a reference value the number of pulses is changed to effectively shift the transitions with respect to one another.

2 Claims, 1 Drawing Sheet

FIELD TYPE DETECTOR FOR VIDEO SIGNAL

This invention is directed to a circuit for distinguishing between the odd and even fields of a composite video signal.

BACKGROUND

The need to distinguish between odd and even fields arises when an auxiliary image is simultaneously displayed as an overlay to a primary image which typically fills the display area. For example, a picture-in-picture (pix-in-pix) display or the display of a function menu. The overlay and primary fields are asynchronous, making it necessary to distinguish between odd and even field types to assure that the overlay signal is stable with respect to the main field in order to maintain proper interlace and avoid jitter of the auxiliary display.

A known technique of distinguishing between the odd and even fields of a composite video signal includes monitoring the horizontal and vertical blanking signals. The blanking signals are provided by a deflection processor and provide noise immunity. These signals provide time references with respect to the main display which are jitter free because the main display also uses these signals. When the horizontal and vertical deflection signals are used for overlay processing, a problem commonly known as "threshold straddling" frequently arises. Odd and even field type are determined by detecting the phase relationship of the horizontal and vertical blanking signals. A phase exists at which it is impossible to definitely distinguish whether a field should be called even or odd. This is the threshold phase and when the deflection signals are in the vicinity of this phase there is a potential for threshold straddling and vertical jitter of the overlay display can ensue.

There are several techniques which can be used to avoid threshold straddling. One way is to restrict or center the horizontal/vertical blanking relationship. In the NTSC signal the timing of the horizontal and vertical sync pulses is well controlled. However, modern deflection systems produce horizontal and vertical blanking signals which typically have a random phase relationship. Adding to the difficulty of using this phase relationship is the fact that the relationship typically can change from day-to-day, receiver-to-receiver or channel-to-channel. It is theoretically possible to avoid threshold straddling by careful system design, the addition of an alignment circuit or by maintaining tight system tolerances. However, these methods are both impractical and expensive with today's deflection techniques.

A second technique which is more advantageous and prudent is to design an overlay processor which is immune to threshold straddling. This results in an overlay processor which is less expensive and which can be used in a variety of deflection designs. Implementation of this approach requires two functions. First, a means for sensing when the phase relationship is in the vicinity of the threshold. Second, circuitry for shifting the phase relationship away from the vicinity of the threshold. The present invention fulfills both of these requirements. The second requirement can be fulfilled in a number of ways. For example, by delaying either the horizontal or the vertical blanking signal with respect to the other. The invention uses a dual mode field type detector approach. With the dual mode detector approach, when the horizontal/vertical phase relationship of the blanking signals is in the vicinity of the threshold value, a switch-over signal is produced and the phase relationship is moved away from the threshold value. This approach also identifies each field as an odd or an even field. A detector which identifies field type in a manner similar to the invention, but which does not sense when the phase relationship is in the vicinity of the threshold value, is described in U.S. Pat. No. 5,025,496.

SUMMARY

A system for processing video signal having alternating first and second field types, with each field type including composite blanking signals composed of randomly time spaced horizontal and vertical blanking signal components. The difference in the time spacing of the horizontal and vertical components of two consecutive fields is indicative of the field type of the current field. A circuit for changing the time spacing of the current field includes circuitry for separating the vertical signal components and the horizontal signal components. A counter provides a count signal indicative of the number of clock pulses occurring between the negative going transition of the vertical signal component and the positive going transition of the first pulse of the horizontal signal component. A comparator receives the count signal and a reference count signal and provides a switching signal when the count signal is not greater than the reference count signal. Additional circuitry responds to the switching signal and changes the number of clock pulses occurring between the negative going transition of the signal representative of the vertical blanking signal component and the positive going transition of the signal representative of the horizontal blanking signal component and has the effect of shifting the transitions with respect to one another.

BRIEF DESCRIPTIONS OF THE DRAWINGS

DETAILED DESCRIPTION

Figure 1:
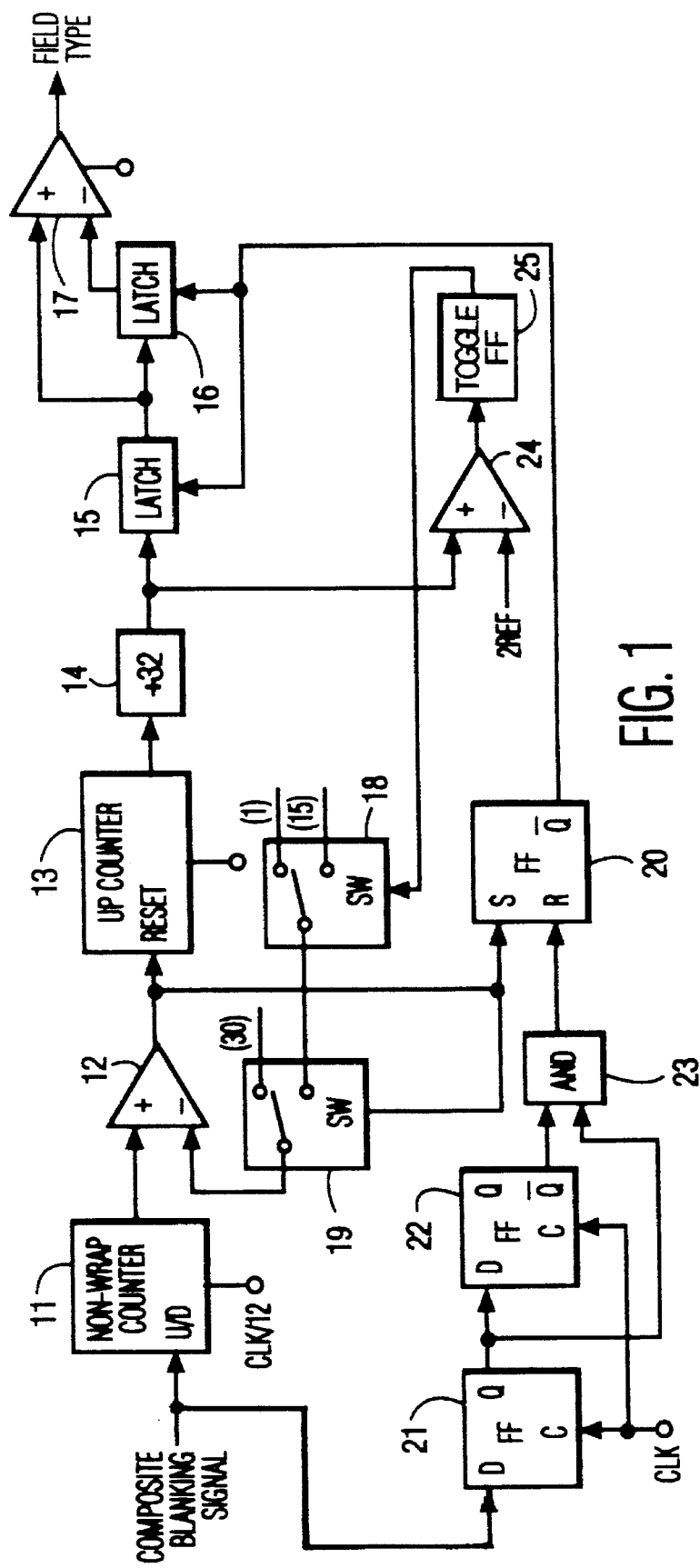
FIG. 1 is a block diagram of a preferred embodiment of circuitry for distinguishing between odd and even fields of a composite video signal, and for sensing the phase relationship of the horizontal and vertical blanking signals and for shifting the phase relationship when required.
Figure 2:
FIG. 2 shows a composite blanking signal.

FIG. 1 shows a preferred embodiment of an odd/even field detector including circuitry for shifting the phase relationship of the vertical and horizontal blanking signals away from the threshold phase at which vertical jitter of the overlay display can occur. A composite blanking signal of the type shown in FIG. 2 is applied to the up/down "U/D" input terminal of a non-wrapping counter 11. A clock signal with a frequency of 4 fsc/12 Hz, or approximately 1 Meg Hz, is applied to the clock input terminal of the counter 11. The counter 11 counts clock pulses upwardly toward a maximum saturation count, 31 for example, when the signal applied to the U/D input terminal is relatively positive or downwardly toward a minimum saturation level, 0 for example, when the signal applied to the U/D input terminal is relatively negative. The counter does not wrap around. Thus, when the counter is counting in either direction and reaches a saturation point before it is conditioned to count in the opposite direction, it continues to provide the output signal ordinarily provided at the saturation point until it becomes conditioned to count in the opposite direction.

The field type identification signal is provided by elements 11 through 17. The output from the non-wrapping counter 11 is applied to one input terminal of a comparator 12 the other input terminal of which receives a reference signal from a switch 19. During respective line intervals the ratio of relatively positive to relatively negative portions of the composite blanking signal is about 1:6. Thus, during respective line intervals the counter will count downward 6 times more often than upward. There are approximately 60 counts per line interval, hence during respective line intervals the counter will exhibit its lower saturation value. Alternatively, during the vertical blanking interval the blanking signal is relatively positive. When the count into the vertical blanking reaches 30, comparator 12 provides a reset level to the reset terminal of counter 13 and three things occur. Counter 13 is held, set/reset flip-flop 20 is set and switch 19 is changed from a first position (0) to a second position (1). The first position applies a signal representative of 30 to comparator 12 while the second position applies a signal dependent upon the setting of switch 18. It is switch 18 and the control thereof by comparator 24 and toggle flip flop 25 that introduces hysteresis in the operation of comparator 12 that shifts the phase relationship between vertical blanking and horizontal blanking away from the "threshold" phase as discussed in detail later. With comparator 12 actuated a signal representative of the vertical blanking signal is provided to counter 13. During the vertical blanking interval, the vertical blanking signal is high and counter 13 is in the reset state and remains in this state until the negative going transition of the output signal of comparator 12 occurs.

The set/reset flip-flop 20 provides clocking pulses to latches 15 and 16 from its $\overline{Q}$ output terminal. The set input terminal of the set/reset flip-flop 20 is presumed to have precedence over the reset terminal so long as the set input terminal receives a high signal. Accordingly, during the vertical blanking period the set terminal is high and the $\overline{Q}$ output terminal is low and latches 15 and 16 are not clocked. At the end of the vertical blanking period, up/down counter 11 decrements. Assuming the counter saturated 31-1=30 or 31-15=16 counts later, comparator 12 goes low, depending upon the condition of switch 18.

At the end of the reset period, up counter 13 begins to count and the set terminal of flip-flop 20 assumes a low value placing the flip-flop in condition to be reset. Latches 15 and 16 can be D-type flip-flops. With a D-type flip-flop, the Q output terminal assumes the value present at the D data input terminal immediately before the application of a pulse transition to the clock input terminal C. When the vertical blanking signal is high, the D input of latch 15 is the same value as the D input signal. Accordingly, when a signal representative of the horizontal blanking signal is received by the reset terminal of flip-flop 20 the $\overline{Q}$ output terminal goes high and latches 15 and 16 are conditioned to store the values present at their respective D input terminals. Latch 15 stores the count which occurred between the end of the reset period and the first horizontal pulse. Latch 16 stores the count which occurred between the end of the reset period and the first horizontal pulse of the preceding field. These two counts are compared in comparator 17 to determine whether the field is odd or even.

A signal representative of the horizontal blanking signal is provided by elements 21 to 23. The composite blanking signal is applied to the D-input terminal of a D-type flip-flop 21, the Q output terminal of which is connected to the D-input terminal of another D-type flip-flop 22. An AND gate 23 has input terminals connected to the Q-output terminal of flip-flop 21 and the $\overline{Q}$ output terminal of flip-flop 22. The output terminal of AND gate 23 is connected to the reset input terminal of set/reset flip-flop 20. The $\overline{Q}$ output signal of flip-flop 21 corresponds to the composite blanking signal. The $\overline{Q}$ output signal of latch 22 corresponds to the composite blanking signal delayed by one clock pulse and inverted in polarity. AND gate 23 provides a logic one output value when the Q output of latch 21 and the $\overline{Q}$ output of latch 22 are logic high values. When the output of AND gate 23 is high, set/reset flip-flop is reset and the $\overline{Q}$ output goes high to supply a control signal to toggle flip-flop 25 and clock pulses to the clock terminals of latches 15 and 16.

The hysteresis needed to change the phasing of the vertical and horizontal signals away from the threshold phase is provided by divider 14, comparator 24, toggle flip-flop 25 and switch 18. Comparator 24 receives a reference count of 2 from a reference source, not shown, and the output from divider 32. Typically, the count on the inverting input terminal of comparator 24 exceeds the reference count on the non-inverting terminal and the phase relationship of the horizontal and vertical components is sufficient to assure accurate identification of the field type. When the phase straddling condition is approached, the inverting input terminal of comparator 24 is lower than the non-inverting terminal and the comparator toggles flip-flop 25 causing switch 18 to switch. The switching of switch 18 changes the count at which the reset period of counter 13 occurs. This change of count also changes the number of clock pulses occurring between the negative going transition of the signal representative of the vertical signal component and the positive going transition of the signal representative of the horizontal signal component and has the effect of shifting the transitions with respect to one another and away from the phase straddling condition.

We claim:

1. A field type detector for identifying first and second field types of a video signal, comprising:

a source of composite blanking signals derived from said video signal and composed of randomly time spaced horizontal blanking and vertical blanking signal components, wherein a difference in the time spacing of said horizontal and vertical blanking components of two consecutive fields is indicative of the field type of a current field of said video signal;

a source of clock pulses;

counter means responsive to said composite blanking signal and to said clock pulses for providing a count signal related to said time spacing for said current field;

means responsive to said current field count signal and to a stored count signal related to said time spacing for the field preceding said current field for providing a field type indication;

comparator means, responsive to said current field count signal and to a reference signal for providing a switching signal when said current field count signal exceeds said reference signal; and means responsive to said switching signal, for altering the operating mode of said counter means so as to modify the relationship between said count signal and said time spacing.

2. A system as recited in claim 1 wherein:

said counter means includes an up/down counter incrementing toward a first saturated count when said composite blanking signal occupies a first level and decrementing toward a second saturated count when said composite blanking signal occupies a second level; and further comprising:

further comparator means 12, for comparing the count output of said up/down counter with a reference count input; and first switching means for alternatively supplying a predetermined high count or a lower count as said reference count input to further comparator means 12, the switching state of said first switching means being responsive to the output of said additional comparator means; and wherein said counter means includes a second counter responsive to said clock pulses and having a reset terminal responsive to the output of said additional comparator means, and means for deriving said current field count signal from the output of said second counter; and wherein said means responsive to said switching signal includes second switching means for alternatively supplying a predetermined intermediate count or a predetermined low count to an input of said first switching means as said lower count;

and means responsive to said switching signal output of said further comparator means for controlling the switching state of said second switching means.

* * * * *